ically 1994

United States Patent [19]
Scola

[11] Patent Number: 5,298,601
[45] Date of Patent: Mar. 29, 1994

[54] HIGH TEMPERATURE 3F-POLYIMIDES

[75] Inventor: Daniel A. Scola, Glastonbury, Conn.

[73] Assignee: United Technologies Corporation, Hartford, Conn.

[21] Appl. No.: 985,702

[22] Filed: Dec. 4, 1992

[51] Int. Cl.[5] .................. C08G 69/26; C08G 73/10
[52] U.S. Cl. .................................. 528/353; 528/125;
528/126; 528/128; 528/170; 528/172; 528/173;
528/179; 528/185; 528/188; 528/220; 528/229;
528/350
[58] Field of Search ............. 528/353, 125, 126, 128,
528/179, 170, 172, 352, 173, 188, 198, 229, 220,
350

[56] References Cited

U.S. PATENT DOCUMENTS

| | | | |
|---|---|---|---|
| 3,310,573 | 3/1967 | Coe | 528/353 |
| 3,705,870 | 12/1972 | Darmory et al. | 528/353 |
| 3,745,149 | 7/1973 | Serafini et al. | 528/353 |
| 3,899,309 | 8/1975 | Hoehn et al. | 29/16 |
| 4,063,984 | 12/1977 | Critchley | 428/458 |
| 4,196,277 | 4/1980 | Jones et al. | 528/208 |
| 4,197,339 | 4/1980 | Paul et al. | 427/370 |
| 4,206,106 | 6/1980 | Heilman et al. | 528/353 |
| 4,244,853 | 1/1981 | Serafini et al. | 528/353 |
| 4,307,024 | 12/1981 | Kray et al. | 528/353 |
| 4,315,080 | 2/1982 | Gagliani et al. | 521/189 |
| 4,336,175 | 6/1982 | Gibbs | 524/726 |
| 4,338,430 | 7/1982 | Edelman | 528/222 |
| 4,395,514 | 7/1983 | Edelman | 524/600 |
| 4,485,140 | 11/1984 | Gannett et al. | 428/260 |
| 4,569,988 | 2/1986 | Scola et al. | 528/353 |
| 4,576,857 | 3/1986 | Gannett et al. | 428/260 |
| 4,742,152 | 5/1988 | Scola | 528/353 |
| 4,758,380 | 7/1988 | Alston et al. | 549/241 |
| 4,801,682 | 1/1989 | Scola | 528/353 |
| 4,863,640 | 9/1989 | Scola | 549/241 |
| 4,954,609 | 9/1990 | Vora | 528/353 |
| 5,091,505 | 2/1992 | Serafini et al. | 528/353 |
| 5,132,395 | 7/1992 | Serafini et al. | 528/353 |
| 5,149,760 | 9/1992 | Serafini et al. | 528/353 |
| 5,149,772 | 9/1992 | Serafini et al. | 528/353 |

FOREIGN PATENT DOCUMENTS 1062435 3/1967 United Kingdom.
1216505 12/1970 United Kingdom.

OTHER PUBLICATIONS

Abstract and Papers presented at the Second International Conference on Polyimides, Oct. 30–Nov. 1, 1985, Ellenville, N.Y., USA–Sponsored by Mid-Hudson Section Society of Plastics Engineers, Inc., "Structure-To-Glass Transition Temperature Relationships In High Temperature Stable Condensation Polyimides" by William B. Alston and Roy F. Gratz, pp. 30–46.

J. Org. Chem., vol. 42, Nov. 7, 1977, "Synthesis of Multifunctional Triarylfluoroethanes. 1. Condensation of Fluoro Ketones" by William D. Kray and Robert W. Rosser, pp. 1186–1189.

TRW Space & Technology Group Paper on TRW–-R-8XX "A Low-cost, Processable, Non-MDA, Ultra-high-temperature Composite Matrix Resin".

Paper presented at the High Temple Workshop XII, Cocoa Beach, Fla., Jan. 27–30, 1992 "Thermo–Oxidative Stability of Polyimides and Polyimide/Graphite Composites At 371° C. (700° F.), 1 and 4 Atmospheres" by Daniel A. Scola and Martin Wai.

*Primary Examiner*—John Kight, III
*Assistant Examiner*—P. Hampton-Hightower
*Attorney, Agent, or Firm*—George J. Romanik

[57] ABSTRACT

A high temperature fluorinated polyimide is made by forming a solution that includes a 3F-monomer and an aromatic or aliphatic diamine such that the solution has a ratio of 3F-monomer to diamine of greater than 1.05. The 3F-monomer is 4,4'-(2,2,2-trifluoro-1-phenylethylidene) diphthalic anhydride, a dialkylester of 4,4'-(2,2,2-trifluoro-1-phenylethylidene) diphthalic anhydride, 4,4'-(2,2,2-trifluoro-1-phenylethylidene) diphthalic acid, or mixtures thereof. The solution is mixed so the 3F-monomer reacts with the diamine to form a 3F-polyimide.

10 Claims, 1 Drawing Sheet

HIGH TEMPERATURE 3F-POLYIMIDES

CROSS-REFERENCE TO RELATED APPLICATION

This application relates to commonly assigned U.S. application Ser. No. 07/985,701, entitled "Fluorinated Condensation Copolymides," filed on even date herewith.

TECHNICAL FIELD

The present invention is directed to fluorinated polyimide compositions suitable for use at high temperatures.

BACKGROUND ART

In recent years, materials that include polymeric resins have replaced metal components for many aerospace applications. For example, polymeric materials, particularly polymeric composite materials, have been used to make gas turbine engine and missile components. They also have been used in other applications requiring low weight and high strength. Although many applications to date have involved military products, polymeric materials will increasingly be used in civilian products. Two near term civilian applications are advanced commercial gas turbine engines and the High Speed Civil Transport.

When used for gas turbine engines or other aerospace applications, polymeric materials are often exposed to hot air environments that can cause thermal and thermo-oxidative degradation. For example, parts in a gas turbine engine can be exposed to air at temperatures between 315° C. and 400° C. To be suitable for many applications, polymeric materials must resist oxidation or degradation in flowing air at pressures up to 480 kPa (70 psi) and at temperatures that can exceed 370° C.

Polyimide materials, including PMR-II-30, PMR-II-50, PMR-15, AFR-700B, and Avimid-N ™, are among the polymeric materials currently used in aerospace applications. PMR-II-30, PMR-II-50, and PMR-15 were developed by NASA Lewis and are licensed to various companies. AFR-700B was developed by TRW, Inc. (Redondo Beach, Calif.) under contract to the United States Air Force. Avimid-N ™ was developed by E.I. DuPont de Nemours and Company (Wilmington, DE). A particularly promising group of polyimides are 3F-polyimides, also known as 3F-PI. 3F-PI materials include 3F-PDA. 3F-PDA comprises polymer units having the formula:

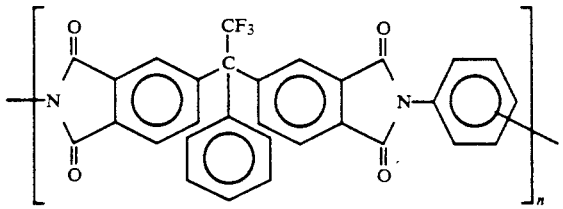

3F-PI materials are made by polymerizing 4,4'-(2,2,2-trifluoro-1-phenylethylidene) diphthalic anhydride or a dialkylester of 4,4'-(2,2,2-trifluoro-1-phenylethylidene) diphthalic anhydride with a diamine. 3F-PI materials are described in more detail in commonly assigned U.S. Pat. Nos. 4,742,152, 4,801,682, and 4,863,640, all to Scola. Like other current polyimide materials, 3F-PI materials can have acceptable thermo-oxidative stability under some conditions. It would, however, be desirable to improve their thermo-oxidative stability to permit them to function under more severe conditions.

Therefore, what is needed in the industry are 3F-PI resins that have better thermo-oxidative stability than prior art polyimide resins.

DISCLOSURE OF THE INVENTION

The present invention is directed to 3F-PI resins that have better thermo-oxidative stability than prior art polyimide resins.

One aspect of the invention includes a method of making a high temperature fluorinated polyimide. A solution including a 3F-monomer and an aromatic or aliphatic diamine is formed such that the solution has a ratio of 3F-monomer to diamine of greater than 1.05. The 3F-monomer comprises 4,4'-(2,2,2-trifluoro-1-phenylethylidene) diphthalic anhydride, a dialkylester of 4,4'-(2,2,2-trifluoro-1-phenylethylidene) diphthalic anhydride, 4,4'-(2,2,2-trifluoro-1-phenylethylidene) diphthalic acid, or mixtures thereof. The solution is mixed so the 3F-monomer reacts with the diamine to form a 3F-polyimide.

Another aspect of the invention includes a 3F-polyimide made by the method described above.

These and other features and advantages of the present invention will become more apparent from the following description and accompanying drawing.

BEST MODE FOR CARRYING OUT THE INVENTION

Figure 1:
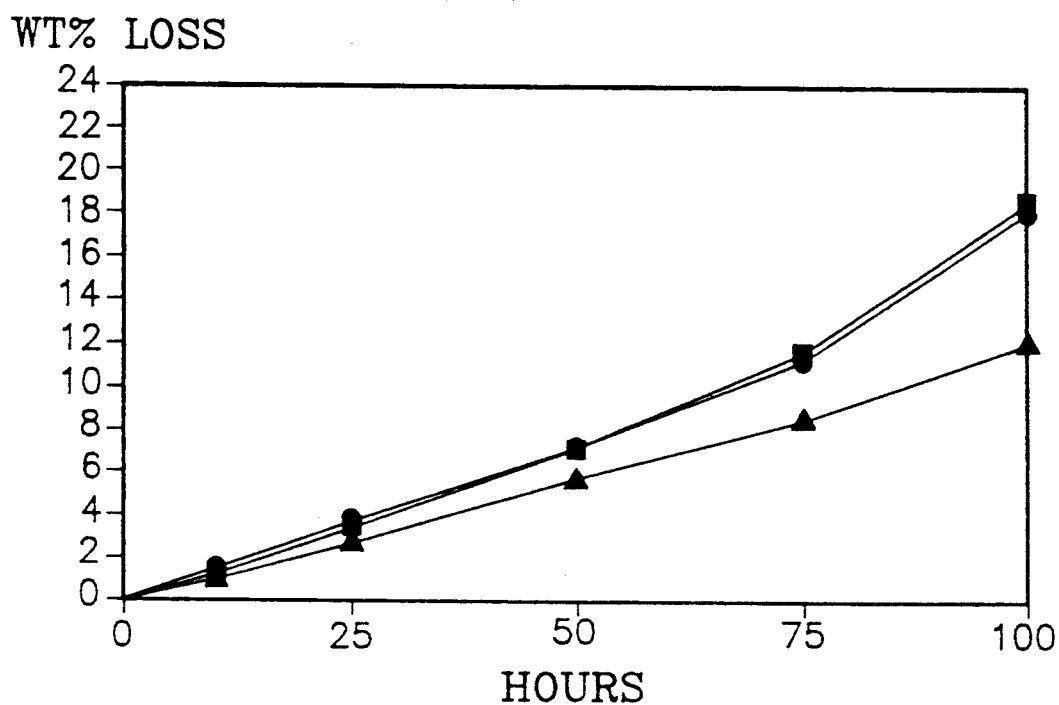
FIG. 1 is a graph of the thermo-oxidative stability of a 3F-PDA resin of the present invention and two baseline resins in a 100 ml/min air flow at 371° C. and 405 kPa.

High temperature 3F-polyimide resins of the present invention (3F-PI) can be made by reacting a 3F-monomer with an aromatic or aliphatic diamine. Suitable 3F-monomers include 4,4'-(2,2,2-trifluoro-1-phenylethylidene) diphthalic anhydride (3F-dianhydride or 3FDA), a dialkylester of 4,4'-(2,2,2-trifluoro-1-phenylethylidene) diphthalic anhydride (3F-dialkylester or 3FDE) or 4,4'-(2,2,2-trifluoro-1-phenylethylidene) diphthalic acid (3F-tetra acid or 3FTA). A key aspect of the invention involves controlling the molar ratio of 3F-dianhydride to diamine during the polymerization reaction to improve the thermo-oxidative stability of the polyimide.

3F-monomers can be made from a series of intermediates including 1,1'-(2,2,2-trifluoro-1-phenylethylidene)-bis(3,4-dimethyl benzene) (3F-tetramethyl or 3FTM). The synthesis of the 3F-PI of the present invention and the corresponding intermediates is discussed below.

3F-tetramethyl (3FTM) can be made by a room temperature method or an autoclave method. In the room temperature method, 2,2,2'-trifluoroacetophenone is dissolved in xylene to form a reaction mixture. Ortho-xylene is preferred for the reaction mixture because it yields 1,1'-(2,2,2-trifluoro-1-phenylethylidene)bis(3,4-dimethylbenzene), which has the methyl groups in favorable positions for oxidation to 3FTA. Preferably, the reaction mixture will have a molar excess of xylene of about 5:1 to about 20:1 to improve product yield. Most preferably, the reaction mixture will have a molar excess of xylene of about 10:1 to about 17:1. The reaction mixture also should include about 4 weight percent (wt %) to about 12 wt % of a strong Friedel-Crafts acid catalyst, such as trifluoromethanesulfonic acid. After preparation, the reaction mixture should be stirred at room temperature for about 2 days to about 4 days. While the mixture is stirred, an oily layer and a xylene layer form and solid 3FTM crystallizes from the mixture. The 3FTM should be filtered from the mixture, washed with water or an alcohol/water solution, and dried. Additional product can be collected by recovering the excess xylene by distillation to leave a concentrated oily layer. Upon cooling, the oily layer crystallizes to form solid 3FTM. The 3FTM formed from the oily layer can be filtered, washed in water or an alcohol/water solution, dried, and combined with the main batch of 3FTM. In the autoclave method, a reaction mixture of xylene, 2,2,2'-trifluoroacetophenone, and trifluoromethanesulfonic acid can be mixed at about 125° C. to about 175° C. and atmospheric pressure for about 3 hr to about 5 hr to form 3FTM. The room temperature method is preferred because its yields are better, it is more convenient, and it consumes less energy. The reaction can be written as:

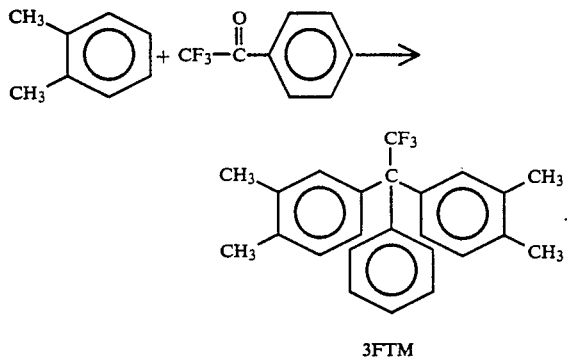

3FTM

The reactants and catalyst for the 3FTM synthesis are available from commercial sources. For example, o-xylene can be purchased from J. T. Baker Chemical Company (Phillipsburg, N.J.). 2,2,2'-trifluoroacetophenone can be purchased from PCR, Inc. (Gainesville, Fla.) and Aldrich Chemical Company (Milwaukee, Wis.). Trifluoromethanesulfonic acid can be purchased from Aldrich Chemical Company and PCR, Inc.

3F-tetra acid (3FTA) can be made by forming a reaction mixture of 3FTM and a nitric acid solution. Nitric acid is available from commercial sources, including J. T. Baker Chemical Co. The concentration of the nitric acid and the molar ratio of nitric acid to methyl groups in the mixture should be selected to limit the formation of nitration products. For example, molar ratios of nitric acid to methyl groups of about 2.2 to about 3.0 with nitric acid concentrations of about 15 wt % to about 24 wt % can be used. Preferably, the molar ratio will be about 2.2 to about 2.5 with a nitric acid concentration of about 20 wt %. Most preferably, the molar ratio of nitric acid to methyl groups will be about 2.5. Higher molar ratios, for example about 3.0 to about 4.6, and higher nitric acid concentrations, for example about 25 wt % to about 37 wt %, can be used, but may produce relatively large amounts of nitration products. To oxidize the 3FTM, the reaction mixture should be heated to an elevated temperature between about 150° C. and about 250° C. and held at the elevated temperature for about 0.5 hr to about 1.5 hr. The rate of temperature rise should be carefully controlled, especially on approaching 180° C., to prevent an exothermic reaction that can increase the quantity of nitration products. Higher temperatures and longer times can be used, but can produce more nitration products. 3FTA can be crystallized from the oxidized reaction mixture by rapidly cooling the mixture, for example to room temperature or cooler, and evaporating the liquid under a vacuum. For example, the liquid can be evaporated in a rotary evaporator operated at a vacuum of about 2.7 kPa (20 mm Hg) to about 4 kPa (30 mm Hg) at about 80° C. Alternately, the oxidized reaction mixture can be allowed to stand for a sufficient time, for example overnight, to allow crystals to form directly from the acid solution. Product that crystallizes from the nitric acid solution can be purer than product produced by evaporation. In both cases, the 3FTA can be further purified by chemically converting it to 3FDA and hydrolyzing the 3FDA back to 3FTA. The 3FTA can be in the form of a pure compound, a monohydrate, or a dihydrate. The dihydrate can be converted to the monohydrate by heating the dihydrate, for example at about 60° C. for about 1 hr in a vacuum. The 3FTA that crystallizes from the nitric acid solution is the pure acid. This reaction can be written as:

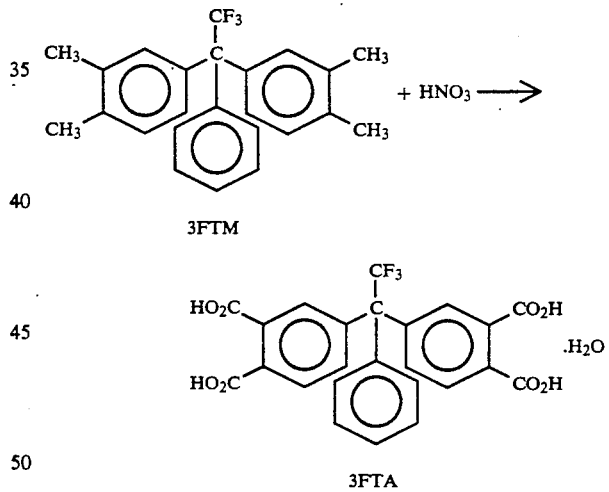

3FTA 3F-dianhydride (3FDA) can be made by dehydrating 3FTA by a thermal method or a chemical method. In the thermal method, 3FTA can be heated to a temperature between about 180° C. and about 250° C. in a vacuum of, for example, about 0.13 kPa (1 mm Hg) to about 4 kPa (30 mm Hg) for about 1 hr to about 3 hr to form water and 3FDA. In the chemical method, 3FTA should be dissolved in a molar excess of an aliphatic anhydride/acid solution, such as acetic anhydride/acetic acid, propionic anhydride/propionic acid, or butanoic anhydride/butanoic acid. An acetic anhydride/acetic acid solution is preferred. A molar excess of about 5:1 to about 15:1 of aliphatic anhydride is preferred. The anhydrides and acids are available from commercial sources, including J. T. Baker Chemical Company and Aldrich Chemical Company. The 3FTA/aliphatic anhydride solution should be heated to reflux (boiling) conditions and refluxed for about 0.5 hr to about 2 hr before crystallizing 3FDA from the solution. 3FDA can be crystallized by adding xylene, such as o-xylene, toluene, benzene, or mixtures thereof to the hot solution. Alternately, the solution can be cooled to a temperature between less than about 0° C. and about 25° C. to precipitate 3FDA crystals. After crystallization, the 3FDA crystals should be washed and dried. A purer 3FDA product can be obtained by recrystallizing the material from an anhydride/acid solution. The chemical method of synthesizing 3FDA is preferred because it produces a purer product and consumes less energy than the thermal method. The reaction can be written as follows:

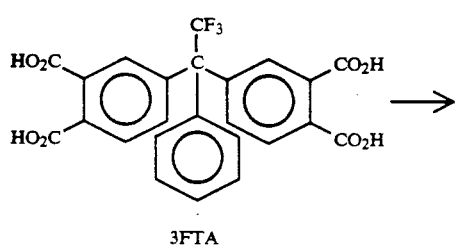

3FTA

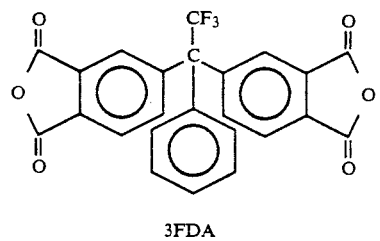

3FDA 3F-dialkylester (3FDE) can be made by refluxing 3FDA with a molar excess of a short chain alcohol, such as methanol or ethanol, until the 3FDA completely dissolves. This step, which can take about 1 hr to about 4 hr, is controlled by stopping the reflux as soon as the 3FDA dissolves to prevent formation of undesirable triesters or tetraesters. A molar excess of about 5:1 to about 10:1 of the alcohol is preferred. To isolate 3FDE, excess alcohol should be evaporated at a temperature less than about 40° C. under a vacuum of, for example, about 0.13 kPa (1 mm Hg) to about 4 kPa (30 mm Hg) to form an oil. Temperatures greater than about 40° C. can cause the reverse reaction to the dianhydride to occur. The oil can be vacuum dried at about 60° C. to about 100° C. for sufficient time to yield 3FDE crystals. Preferably, the 3FDE/alcohol solution will be used to form 3F-PDA as described below without isolating 3FDE crystals. The diesterification reaction can be written as:

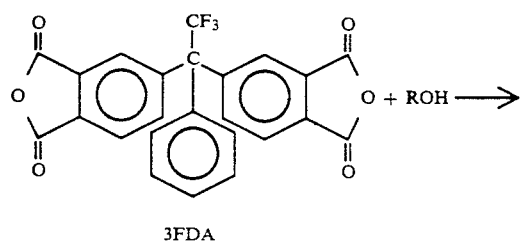

3FDA

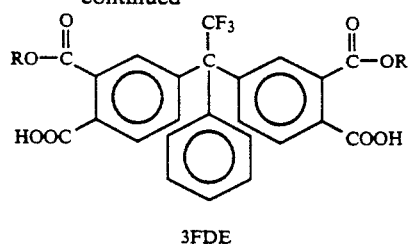

3FDE

3F-PI resin can be made by polymerizing a 3F-monomer with an aromatic or aliphatic diamine. The 3F-monomer may be 3FDA, 3FDE, 3FTA, or mixtures thereof. Preferably, the diamine will be an aromatic diamine, such as p-phenylene diamine (p-PDA) or a mixture of p-PDA and m-PDA. Most preferably, the diamine will be substantially pure p-PDA. Other suitable diamines include 4,4'-biphenylene diamine and 2,2'-bis(trifluoromethyl)-4,4'-diaminobiphenyl. In addition, the diamine can comprise any of a number of fused aromatic rings such as naphthalene, anthracene, phenanthrene, indene, pyrene, triphenylene, and substituted fused aromatic ring systems. Typically, a naphthalene diamine can have the diamine in the (1,2), (1,3), (1,4), (1,5), (1,6), (1,7), (1,8), (2,3), (2,4), (2,5), (2,6), (2,7), and (2,8) positions. The (1,4), (1,5), (1,7), (2,6), and (2,8) positions are preferred. Typically, an anthracene diamine can have the diamine in the (1,2), (1,3), (1,4), (1,5), (1,6), (1,7), (1,8), (1,9), (1,10), (2,3), (2,4), (2,5), (2,6), (2,7), (2,8), and (2,9) positions. The (1,4), (1,7), (2,6), and (2,9) positions are preferred. The diamine also may comprise any of a number of heteroaromatic ring systems such as quinoline, pyridene, acridine, thiophene, indole, and substituted heteroaromatic ring systems. Examples of additional suitable diamines include 3,3'-or 4,4'-diaminobenzophenone, 3,3'-, 4,4'-, or 3,4'-oxydianiline, 1,2-, 1,3-, 1,4-, 1,5-, 1,6-, 1,7-, 1,8-, 2,3-, 2,4-, 2,5-, 2,6-, 2,7-, or 2,8-diaminonaphthalene, 4,4'-bis(3-aminophenoxy)benzophenone, and 3,3'-diaminodiphenylsulfone. Reacting a 3F-monomer with PDA forms poly [1,4-phenylene-4,4'-(2,2,2-trifluoro-1-phenylethylidene)]bisphthalimide, the 3F-PDA resin. The reaction between 3FDE and PDA can be written as:

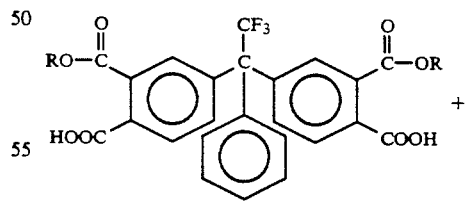

3FDE

+

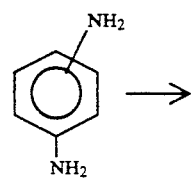

p- or m-PDA

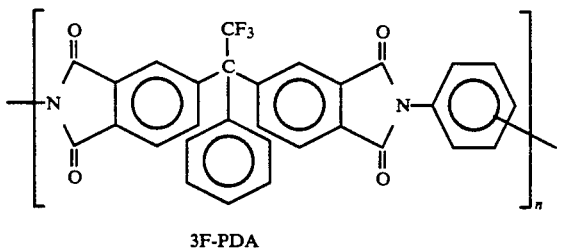

3F-PDA

The 3F-monomer and the diamine should be dissolved in a suitable solvent, such as alcohol, dimethyl acetamide (DMAc), N-methylpyrrolidone (NMP), or diethylene glycol dimethyl ether (diglyme). For example, the solvent can be methanol or ethanol. If the 3F-PI is made directly from a 3FDE solution, the alcohol solvent in the solution can be used to dissolve the diamine. The 3F-monomer should be mixed with the diamine at a suitable temperature, for example between room temperature and about 50° C., for a sufficient time until the reactants dissolve. As the reactants dissolve, they react with each other to form 3F-PI precursors. To achieve the enhanced thermo-oxidative stability of the present invention, the 3F-monomer and diamine should be mixed to form a solution with a 3F-monomer:diamine molar ratio greater than 1.05. Preferably, the 3F-monomer:diamine ratio in the solution will be about 1.06 to about 1.10 and, most preferably, about 1.08 to about 1.09. As the ratio of 3F-monomer:diamine increases, the molecular weight of the 3F-PI decreases. As molecular weight decreases, the fracture toughness and other mechanical properties of the material decrease. Therefore, the upper limit of the 3F-monomer:diamine ratio is set by molecular weight and mechanical property considerations.

The 3F-PI resin of the present invention can be used in solution form to impregnate reinforcing fibers in a prepreg. The fibers may be graphite fibers, glass fibers, kevlar fibers, or any other fibers compatible with 3F-PI and may be woven into a cloth or arranged in any other form or orientation. The 3F-PI itself may be spun into fibers. Alternately, the solvent in the 3F-PI solution can be removed, for example by vacuum drying at about 60° C. for about 1 hr to about 2 hr, to form a powder. The powder can be molded into shaped objects or redissolved in a suitable solvent, such as methanol or ethanol, for use in advanced coating applications. The 3F-PI resin can be imidized and postcured by conventional methods. For example, the 3F-PI can be heated to about 120° C. for about 1 hr, then to about 220° C. for about 2 hr, and finally to about 275° C. for about 1 hr. The imidized material can be postcured at about 415° C. for about 8 hr.

The following examples demonstrate the present invention without limiting the invention's broad scope.

EXAMPLE 1

600 ml (528 g, 4.974 mole) o-xylene (Baker grade, J. T. Baker Chemical Company, Phillipsburg, N.J.), 50 g (0.287 mole) trifluoroacetophenone (PCR, Inc., Gainesville, Fla.), and 25 ml (42.4 g, 0.282 mole) trifluoromethanesulfonic acid (Aldrich Chemical Company, Milwaukee, Wis.) were added to a three neck, round bottom flask to form a reaction mixture. The flask had a reflux condenser and an addition funnel. The reaction mixture was stirred at room temperature for 72 hr, during which time a solid crystallized from the solution. The solid was filtered using a water aspirator, washed with copious amounts of water, air dried, and vacuum dried at 100° C. overnight. The filtrate was separated into an oily layer and a xylene layer. The oily layer was concentrated to one-third its original volume to form additional product. The additional product was filtered, washed with cold water and cold ethanol, vacuum dried at 100° C. overnight, and combined with the major fraction of the solid. The product was a white solid that weighed 81.4 g (77% yield) and had a melting point of 178.5° C. to 180° C. Analysis showed the product to be 3FTM:

calculated for $C_{24}H_{23}F_3$: C, 78.23 wt %; H, 6.29 wt %; F, 15.47 wt % found: C, 78.12 wt %; H, 6.28 wt %; F, 15.47 wt %.

25 g (67.85 mmole) 3FTM and 43.3 ml of a 20 wt % solution of nitric acid (0.6846 mole in 155 ml water) (Baker analyzed, J. T. Baker Chemical Company) were added to a polytetrafluoroethylene-lined 750 ml autoclave (Berghof of America, Inc., Concord, Calif.). The resulting solution had a molar ratio of nitric acid to methyl groups of 2.5. The autoclave was sealed and the temperature was increased to 180° C. over a period of 80 minutes. The temperature was increased slowly to avoid initiating an undesired exothermic reaction. The autoclave was held at 180° C. for 1 hr and then cooled immediately in running tap water. The cooled mixture was removed from the autoclave and placed into a rotary evaporator. The acid was distilled off at 80° C. and a vacuum of 2.7 kPa (20 mm Hg) to 4 kPa (30 mm Hg) to produce a solid residue. The solid residue was dried overnight at 80° C. in a vacuum to yield 13.0 g (92% yield) of a yellow solid with a melting point of 120° C. to 125° C. Analysis showed the product to be the dihydrate of 3FTA:

calculated for $C_{24}H_{19}F_3O_{10}$: C, 54.98 wt %; H, 3.65 wt %; F, 10.87 wt % found: C, 54.70 wt %; H, 3.46 wt %; F, 10.48 wt %. The monohydrate of 3FTA was obtained by heating the dihydrate at 60° C. for 1 hr in a vacuum. Analysis of the monohydrate showed:

calculated for $C_{24}H_{19}F_3O_9$: C, 56.92 wt %; H, 3.28 wt %; F, 11.26 wt % found: C, 56.21 wt %; H, 3.02 wt %; F, 10.38 wt %.

A solution of 28.16 g (57.66 mmole) 3FTA, 23 ml (24.1 g, 0.236 mole) acetic anhydride (Aldrich Chemical Company), and 13 ml glacial acetic acid (Aldrich Chemical Company) was prepared, heated to reflux conditions, and refluxed for 1.5 hr. The hot solution was gravity filtered and 25 ml o-xylene was added to form crystals immediately. The mixture was filtered, washed with 10 ml glacial acetic acid and 30 ml o-xylene, and vacuum dried at 105° C. overnight to yield 27.8 g (87% yield) of a white solid with a melting point of 198° C. to 200° C. This product was recrystallized from a solution of 24 ml acetic anhydride and 18 ml acetic acid to yield 25 g (78% yield) of a white solid with a melting point of 201° C. to 202° C. Analysis showed the product to be 3FDA:

calculated for $C_{24}H_{11}F_3O_6$: C, 63.72 wt %; H, 2.45 wt %; F, 12.60 wt % found: C, 63.62 wt %; H, 2.39 wt %; F, 12.48 wt %.

10.0 g (22.108 mmole) 3FDA and 12.3 ml (0.221 mole) absolute ethanol (Quantum Chemical Corporation, USI Division, Cincinnati, Ohio) were added to a 50 ml round bottom flask. The mixture was refluxed for 1 hr to dissolve the 3FDA completely. 2.2044 g (20.385 mmole) of p-PDA were added to the 3FDA solution to produce a 3F-monomer:diamine molar ratio of 1.0845. The solution was stirred at room temperature until the p-PDA dissolved. As the p-PDA dissolved, the solution turned from light amber to brown to deep purple. The solution was concentrated on a hot plate at 50° C. to form a viscous liquid and was then dried under a vacuum at 60° C. for 2 hr to form a purple crystalline solid. The crystalline solid was imidized by heating it to 125° C. for 2 hr, then to 220° C. for 2 hr, and, finally, to 275° C. for 1 hr to yield 11 g of a brown-purple powder. The powder was compression molded into discs by heating it to 371° C. and applying 69 kPa (1000 psi) pressure for 4 hr. The discs were then postcured by heating them at 415° C. for 8 hr.

EXAMPLE 2

(Comparative Example)

2.38 g (22.04 mmole) of p-PDA were added to an ethanol solution containing 12.0 g (22.04 mmole) of 3FDE to produce a 3F-monomer:diamine molar ratio of 1.0000. The solution was stirred at room temperature until the p-PDA dissolved to form a 3F-PDA solution as in Example 1. The 3F-PDA was then crystallized, imidized, and formed into discs as in Example 1.

EXAMPLE 3

(Comparative Example)

2.545 g (23.534 mmole) of p-PDA were added to an ethanol solution containing 12.0 g (22.04 mmole) of 3FDE to produce a 3F-monomer:diamine molar ratio of 0.9365. A 3F-PDA polyimide was then prepared was in Example 2.

EXAMPLE 4

2.232 g (20.64 mmole) of a mixture of 95% p-PDA and 5% m-PDA were added to an ethanol solution containing 12.0 g (22.04 mmole) of 3FDE to produce a 3F-monomer:diamine molar ratio of 1.0678. A 3F-PDA polyimide was then prepared was in Example 2.

EXAMPLE 5

(Comparative Example)

2.383 g (22.04 mmole) of a mixture of 95% p-PDA and 5% m-PDA were added to an ethanol solution containing 12.0 g (22.04 mmole) of 3FDE to produce a 3F-monomer:diamine molar ratio of 1.000. A 3F-PDA polyimide was then prepared was in Example 2.

EXAMPLE 6

(Comparative Example)

2.545 g (23.534 mmole) of a mixture of 95% p-PDA and 5% m-PDA were added to an ethanol solution containing 12.0 g (22.04 mmole) of 3FDE to produce a 3F-monomer:diamine molar ratio of 0.9365. A 3F-PDA polyimide was then prepared was in Example 2.

The discs prepared in the Examples were used in isothermal thermo-oxidative stability studies to determine their thermo-oxidative stability. The studies were carried out at 101 kPa (1 atm) and 405 kPa (4 atm) in a Blue M (Blue Island, Ill.) oven Model IGF-6680F-4. The 101 kPa studies were done at 371° C. in circulating air by placing the specimens on top of an autoclave, which was placed in the oven. The 405 kPa studies were done at 371° C. in an air flow of 100 ml/min by placing the specimens in an autoclave. In both studies, the specimens were weighed before and after the studies to determine weight loss. Data for the 101 kPa studies are presented in Table 1.

TABLE 1

| Example | Ratio 3F-monomer:diamine | Ratio p-PDA/m-PDA | % Wt Loss After 100 hr |
|---|---|---|---|
| 1 | 1.0845 | 100/0 | 3.1 |
| 2 | 1.0000 | 100/0 | 4.25 |
| 3 | 0.9365 | 100/0 | 5.1 |
| 4 | 1.0678 | 95/5 | 3.8 |
| 5 | 1.0000 | 95/5 | 4.4 |
| 6 | 0.9365 | 95/5 | 8.2 |

The data in Table 1 show that thermo-oxidative stability increases with increasing 3F-monomer:diamine ratio. The material made with 100% p-PDA performed better than the material made with 95% p-PDA and 5% m-PDA.

TABLE 2

| Example | Ratio 3F-monomer:diamine | Ratio p-PDA/m-PDA | % Wt Loss After | | | | |
|---|---|---|---|---|---|---|---|
| | | | 10 hr | 25 hr | 50 hr | 75 hr | 100 hr |
| 1 | 1.0845 | 100/0 | 0.98 | 2.66 | 5.71 | 8.5 | 12.1 |
| 2 | 1.0000 | 100/0 | 1.26 | 3.48 | 7.15 | 11.6 | 18.6 |
| 3 | 0.9365 | 100/0 | 1.45 | 3.72 | 7.16 | 11.2 | 18.2 |
| 4 | 1.0678 | 95/5 | 1.28 | 3.33 | 6.52 | 9.7 | 13.3 |
| 5 | 1.0000 | 95/5 | 1.44 | 3.55 | 7.10 | 10.8 | 16.0 |
| 6 | 0.9365 | 95/5 | 1.55 | 4.69 | 10.2 | 18.2 | 29.7 |

Figure 2:
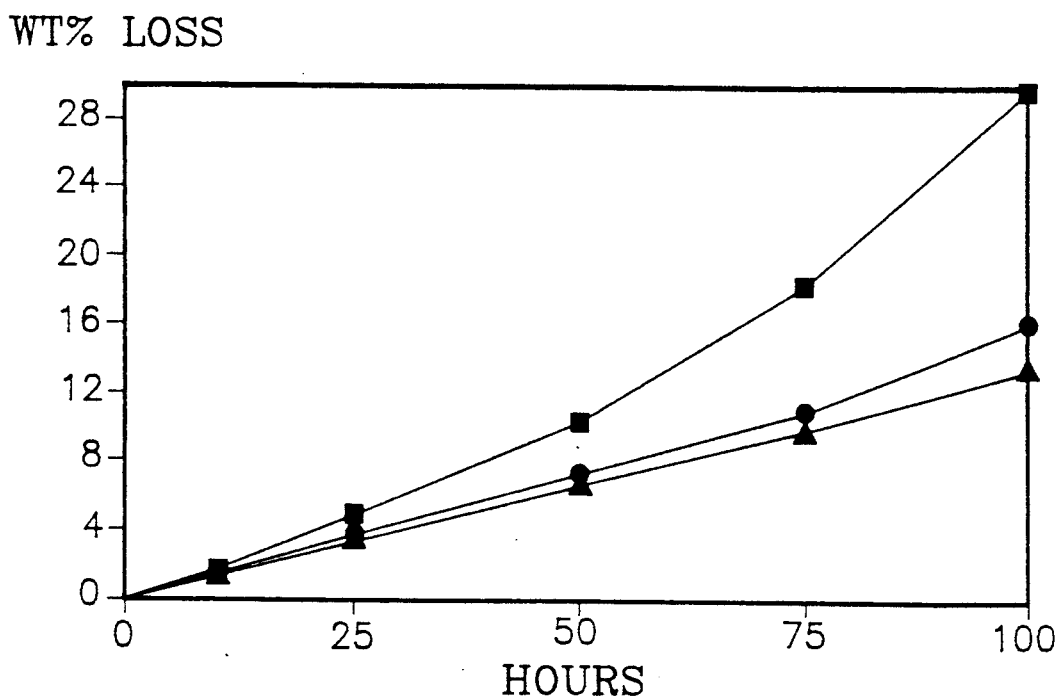
FIG. 2 is a graph of the thermo-oxidative stability of another 3F-PDA resin of the present invention and two additional baseline resins in a 100 ml/min air flow at 371° C. and 405 kPa.

The data in Table 2 also show that thermo-oxidative stability increases with increasing 3F-monomer:diamine ratio. The materials made with 100% p-PDA again performed better than the materials made with 95% p-PDA and 5% m-PDA. FIGS. 1 and 2 show data from Table 2 for examples 1-3 and 4-6, respectively. The data points represented by squares are for resins with 3F-monomer:diamine ratios of 0.9365 (examples 3 and 6). The data points represented by circles are for resins with 3F-monomer:diamine ratios of 1.0000 (examples 2 and 5). The data points represented by triangles are for resins with 3F-monomer:diamine ratios of 1.0845 (example 1) or 1.0678 (example 4).

The invention is not limited to the particular embodiments shown and described herein. Various changes and modifications may be made without departing from the spirit or scope of the claimed invention.

I claim:

1. A method of making a high temperature fluorinated polyimide, comprising the steps of:
   (a) forming a solution comprising
      (i) a 3F-monomer, wherein the 3F-monomer comprises 4,4'-(2,2,2-trifluoro-1-phenylethylidene) diphthalic anhydride, a dialkylester of 4,4'-(2,2,2-trifluoro-1-phenylethylidene) diphthalic anhydride, 4,4'-(2,2,2-trifluoro-1-phenylethylidene) diphthalic acid, or mixtures thereof, and
      (ii) an aromatic or aliphatic diamine, wherein the ratio of the 3F-monomer to the diamine is greater than 1.05; and
   (b) mixing the solution so the 3F-monomer reacts with the diamine to form a 3F-polyimide.

2. The method of claim 1, wherein the ratio of the 3F-monomer to the diamine is about 1.06 to about 1.10.

3. The method of claim 1, wherein the ratio of the 3F-monomer to the diamine is about 1.08 to about 1.09.

4. The method of claim 1, wherein the diamine is selected from the group consisting of phenylene diamine, 4,4'-biphenylene diamine, and 2,2'-bis(trifluoromethyl)-4,4'-diaminobiphenyl.

5. The method of claim 1, wherein the diamine is p-phenylene diamine, m-phenylene diamine, or a mixture of p-phenylene diamine and m-phenylene diamine and the 3F-polyimide is poly [1,4-phenylene-4,4'-(2,2,2-trifluoro-1-phenylethylidene)] bisphthalimide.

6. A 3F-polyimide made by the method of claim 1.

7. The 3F-polyimide of claim 6, wherein the ratio of the 3F-monomer to the diamine is about 1.06 to about 1.10.

8. The 3F-polyimide of claim 6, wherein the ratio of the 3F-monomer to the diamine is about 1.08 to about 1.09.

9. The 3F-polyimide of claim 6, wherein the diamine is selected from the group consisting of phenylene diamine, 4,4'-biphenylene diamine, and 2,2'-bis(trifluoromethyl)-4,4'-diaminobiphenyl.

10. The 3F-polyimide of claim 6, wherein the diamine is p-phenylene diamine, m-phenylene diamine, or a mixture of p-phenylene diamine and m-phenylene diamine and the 3F-polyimideispoly[1,4-phenylene-4,4'-(2,2,2-trifluoro-1-phenylethylidene)]bisphthalimide.

* * * * *